US012709040B2

(12) United States Patent
Lee et al.

(10) Patent No.: US 12,709,040 B2
(45) Date of Patent: Aug. 18, 2026

(54) ELECTRODE CUTTING APPARATUS INCLUDING SEPARATED FOREIGN MATTER REMOVAL UNIT

(71) Applicant: LG Energy Solution, Ltd., Seoul (KR)

(72) Inventors: Ju Won Lee, Daejeon (KR); Seung Hwan Lee, Daejeon (KR); Sung Dong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 361 days.

(21) Appl. No.: 18/003,740

(22) PCT Filed: Aug. 27, 2021

(86) PCT No.: PCT/KR2021/011514
§ 371 (c)(1),
(2) Date: Dec. 29, 2022

(87) PCT Pub. No.: WO2022/045828
PCT Pub. Date: Mar. 3, 2022

(65) Prior Publication Data

US 2023/0249374 A1 Aug. 10, 2023

(30) Foreign Application Priority Data

Aug. 28, 2020 (KR) ........................ 10-2020-0109630

(51) Int. Cl.
*B26D 7/18* (2006.01)
*B26D 1/60* (2006.01)
*B26D 5/02* (2006.01)
*B26D 7/01* (2006.01)

(52) U.S. Cl.
CPC ............. *B26D 7/1845* (2013.01); *B26D 1/60* (2013.01); *B26D 5/02* (2013.01); *B26D 7/018* (2013.01)

(58) Field of Classification Search
CPC .......... B26D 7/1845; B26D 1/60; B26D 5/02; B26D 7/018; B26D 1/01; B26D 1/015
See application file for complete search history.

(56) References Cited

U.S. PATENT DOCUMENTS

2006/0065090 A1* 3/2006 Kaneko ................. B65H 35/06 83/402
2019/0058222 A1 2/2019 Kang
2020/0385229 A1 12/2020 Kim

FOREIGN PATENT DOCUMENTS

CN 101879050 A 11/2010
CN 102028433 A 4/2011
CN 111295348 A 6/2020
(Continued)

OTHER PUBLICATIONS

International Search Report for Application No. PCT/KR2021/011514 mailed Dec. 1, 2021, pp. 1-3.

*Primary Examiner* — Boyer D Ashley
*Assistant Examiner* — Ella L Keena
(74) *Attorney, Agent, or Firm* — Lerner David LLP

(57) ABSTRACT

The present invention relates to an electrode cutting apparatus including a separated foreign matter removal unit capable of immediately removing separated foreign matter generated at the time of electrode cutting through a blow unit and a suction unit configured to be repeatedly operated and stopped according to an electrode cutting operation in order to remove separated foreign matter generated when the electrode cutting apparatus performs electrode cutting.

13 Claims, 5 Drawing Sheets

(56) References Cited

FOREIGN PATENT DOCUMENTS

| | | | | | |
|---|---|---|---|---|---|
| CN | 210650722 | U | | 6/2020 | |
| JP | 2003025136 | A | | 1/2003 | |
| JP | 2009016327 | A | | 1/2009 | |
| JP | 2009190124 | A | | 8/2009 | |
| JP | 6716756 | B1 | * | 7/2020 | ........... B23Q 17/007 |
| KR | 2019930013325 | U | | 7/1993 | |
| KR | 1115299 | B1 | * | 3/2012 | |
| KR | 101115299 | B1 | * | 3/2012 | ........... B26D 7/2614 |
| KR | 101337226 | B1 | | 12/2013 | |
| KR | 20140009015 | A | | 1/2014 | |
| KR | 101475703 | B1 | | 12/2014 | |
| KR | 20150137640 | A | | 12/2015 | |
| KR | 101763453 | B1 | | 7/2017 | |
| KR | 20170097515 | A | | 8/2017 | |
| KR | 20180023812 | A | | 3/2018 | |
| KR | 101893706 | B1 | | 8/2018 | |
| KR | 2120654 | B1 | * | 6/2020 | ............... B26D 1/08 |
| KR | 102120654 | B1 | * | 6/2020 | ............... B26D 7/01 |

* cited by examiner

【FIG. 1】
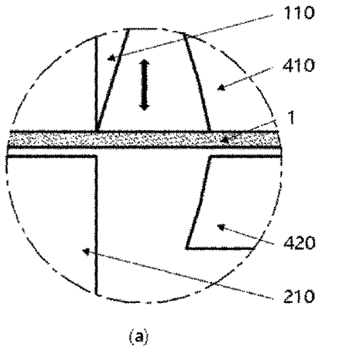
【FIG. 2】
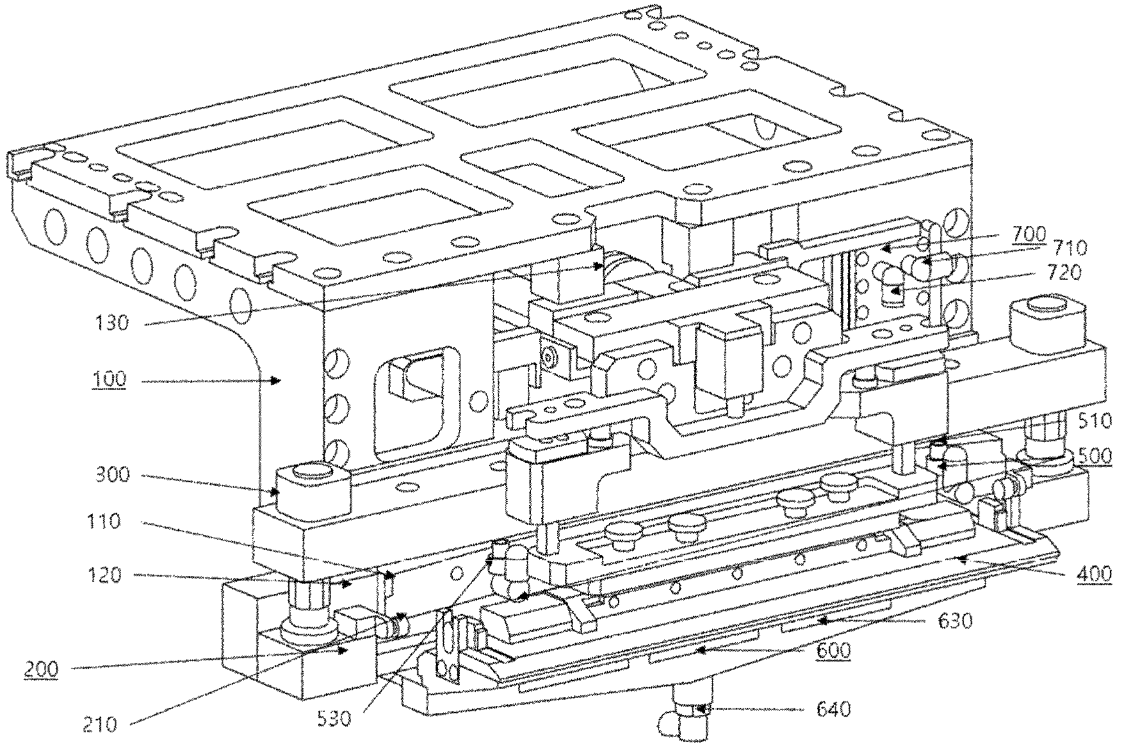

【FIG. 3】
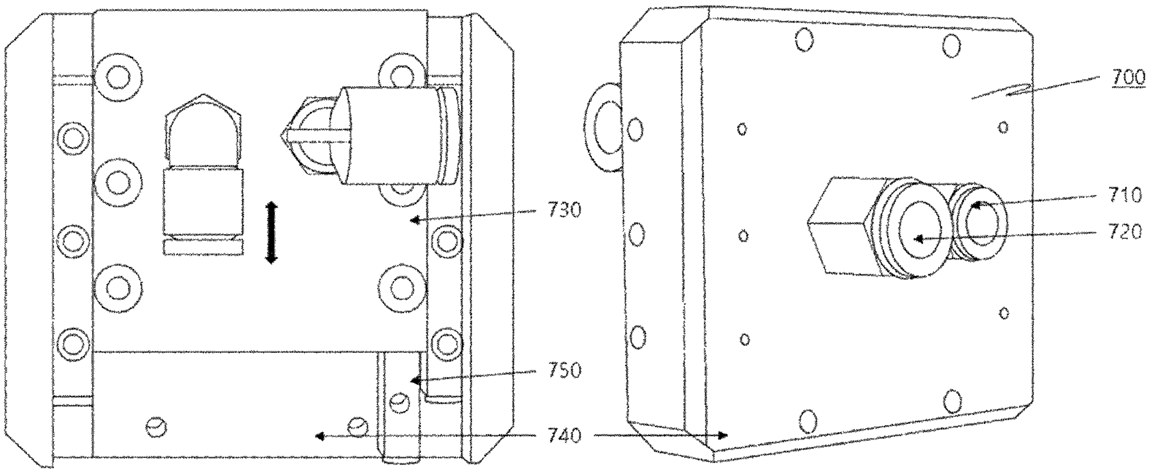

【FIG. 4】
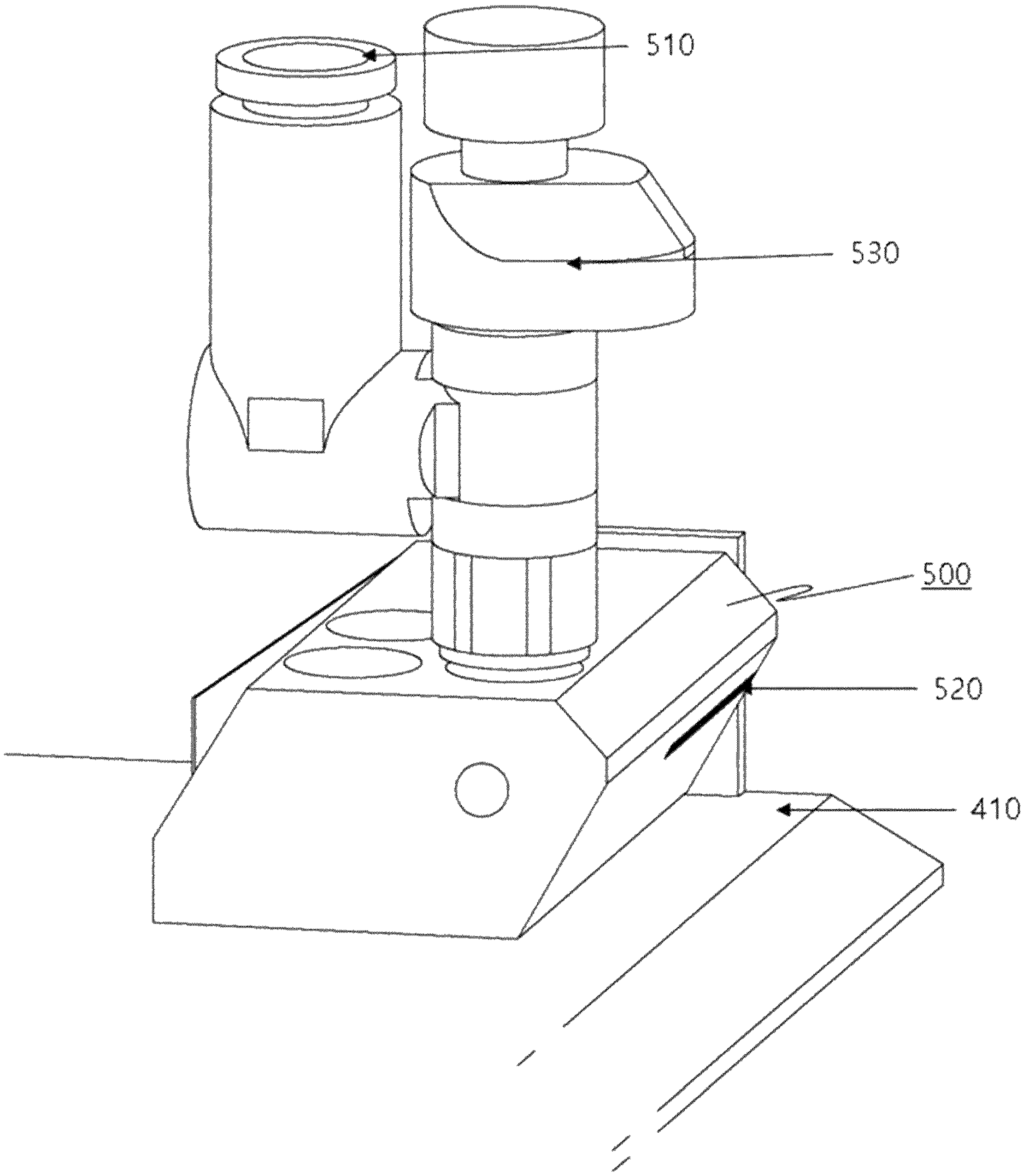

【FIG. 5】
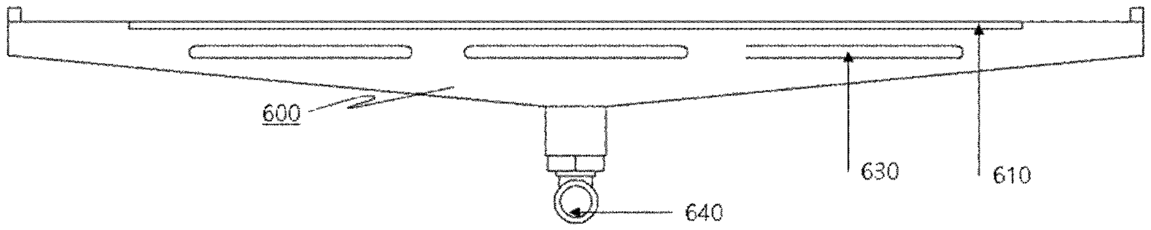
【FIG. 6】
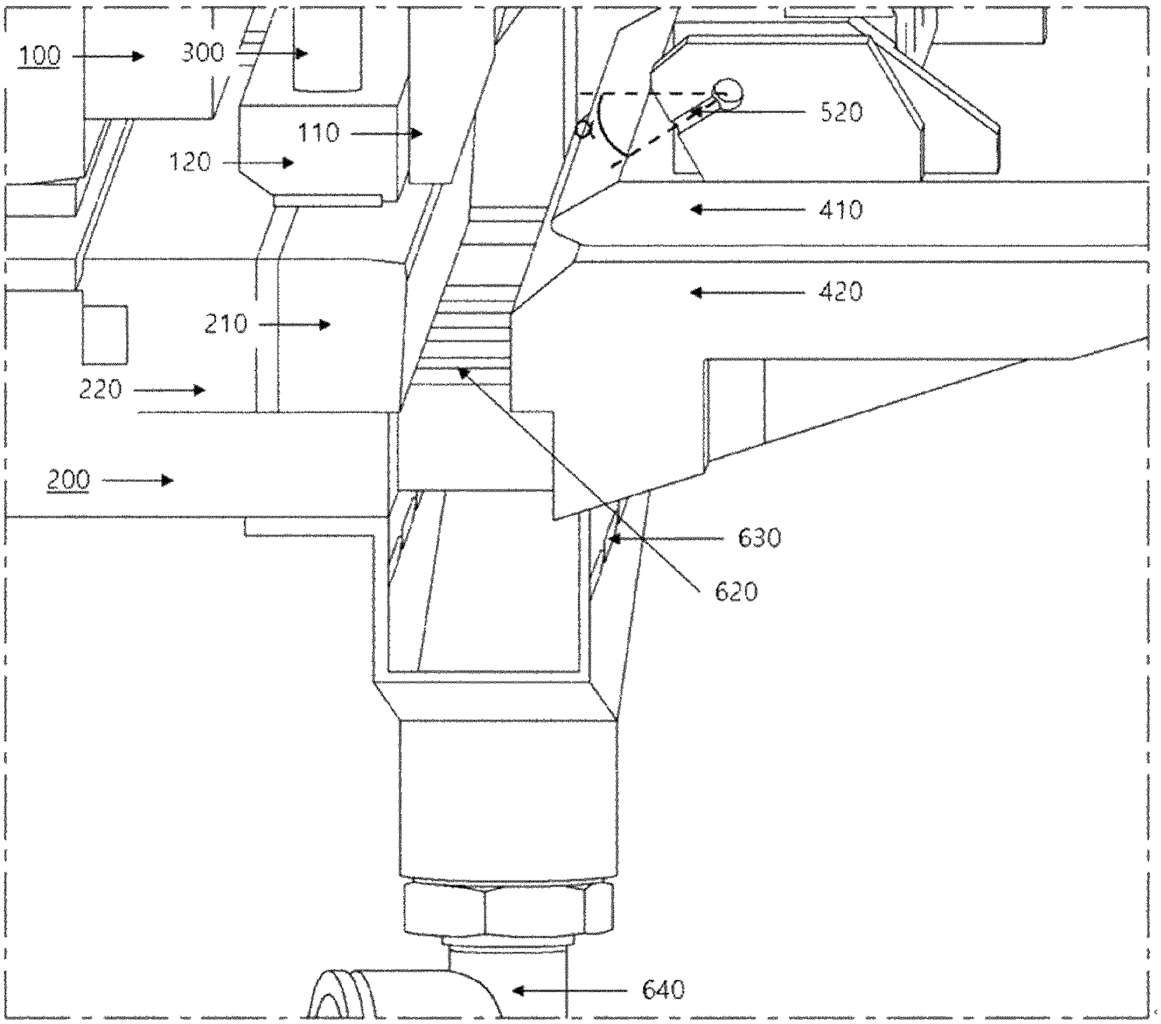

【FIG. 7】
| Cutting Unit | Blow & Suction Unit | Collected particles Picture | Particles weights(mg) |
|---|---|---|---|
| On | Off | 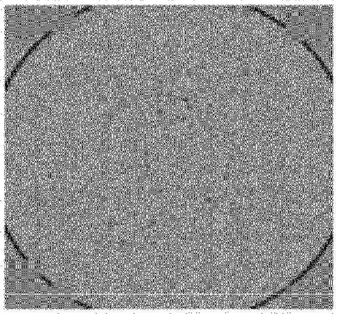 | 2.2 |
| On | On | 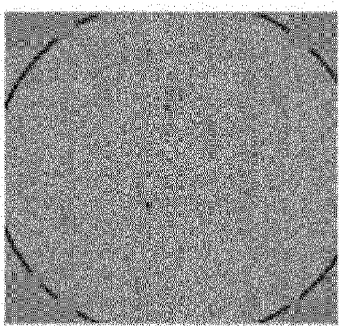 | 1.0 |
【FIG. 8】
| Cutting Unit | Blow & Suction Unit | Particles size distribution(μm) | | |
|---|---|---|---|---|
| | | > 1000 | 600~1000 | < 600 |
| On | Off | 0 | 2 | 1548 |
| On | On | 0 | 1.0 | 956 |

ELECTRODE CUTTING APPARATUS INCLUDING SEPARATED FOREIGN MATTER REMOVAL UNIT

CROSS-REFERENCE TO RELATED APPLICATIONS

This application is a national phase entry under 35 U.S.C. § 371 of International Application No. PCT/KR2021/011514, filed on Aug. 27, 2021, which claims the benefit of priority to Korean Patent Application No. 10-2020-0109630 filed on Aug. 28, 2020, the disclosure of which is incorporated herein by reference in its entirety.

TECHNICAL FIELD

The present invention relates to an electrode cutting apparatus including a separated foreign matter removal unit, and more particularly to an electrode cutting apparatus including a separated foreign matter removal unit capable of immediately removing separated foreign matter generated at the time of electrode cutting through a blow unit and a suction unit configured to be repeatedly operated and stopped according to an electrode cutting operation in order to remove separated foreign matter generated when the electrode cutting apparatus performs electrode cutting.

BACKGROUND ART

A lithium secondary battery, which is capable of being charged and discharged, has been widely used as an energy source for wireless mobile devices or wearable devices, which are worn on bodies, and has also been used as an energy source for electric vehicles and hybrid electric vehicles presented as alternatives to existing gasoline and diesel vehicles, which cause air pollution.

The lithium secondary battery includes an electrode assembly including a stack of a positive electrode plate coated with a positive electrode active material, a negative electrode plate coated with a negative electrode active material, and a separator located between the positive electrode plate and the negative electrode plate, the separator being configured to prevent short circuiting, the separator being configured such that lithium ions (Li-ion) are movable therethrough, a battery case configured to receive the electrode assembly, and an electrolytic solution injected into the battery case such that the lithium ions are movable.

In general, the positive electrode plate and the negative electrode plate may be manufactured through a process of coating a long sheet type positive electrode sheet and a long sheet type negative electrode sheet with a positive electrode active material and a negative electrode active material, respectively, drying and rolling the active materials, and cutting the positive electrode sheet and the negative electrode sheet to a predetermined size to manufacture unit electrodes.

A conventional electrode plate cutting apparatus configured to manufacture the unit electrodes includes a feeding unit configured to feed an electrode plate in a state of being seated, and a cutter installed at one side of the feeding unit. The cutter is divided into an upper cutter and a lower cutter. Specifically, based on the electrode plate, the lower cutter is fixed to the lower side of the electrode plate while the upper cutter is installed at the upper side of the electrode plate, and the upper cutter is moved upwards and downwards at an electrode plate cutting position. When the electrode plate is fed to the cutting apparatus, therefore, the edge of the upper cutter and the edge of the lower cutter come into contact with each other to cut the electrode plate.

As a result of repetitive cross contact between the upper cutter and the lower cutter, however, foreign matter is generated, the edges of the cutters are worn, and the edges of the cutters are curved, whereby the electrode plate is cut in the state in which a cut section is not smooth or a burr is generated.

As the cutting process using the upper cutter and the lower cutter is repeatedly performed, foreign matter is continuously separated from the electrode sheet.

In connection therewith, FIG. 1 is a view showing operation of a conventional electrode cutting apparatus including no separated foreign matter removal unit.

Referring to (a) of FIG. 1, there are shown an upper cutter 110 configured to reciprocate upwards and downwards in order to cut an electrode sheet and a stationary lower cutter 210 configured to cut the electrode sheet that enters between the lower cutter and the upper cutter.

There is also shown a gripper 400 configured to face the electrode sheet, which is supplied between the upper cutter, which performs upward and downward reciprocation, and the lower cutter, which is stationary, in parallel therewith, the gripper being configured to fix the electrode sheet.

There are also shown an upper gripper 410 formed so as to face the upper cutter in parallel therewith and a lower gripper 420 formed so as to face the lower cutter in parallel therewith. The upper gripper and the lower gripper may fix the electrode sheet.

Referring to (b) of FIG. 1, when the upper cutter cuts the electrode sheet while moving downwards, foreign matter may be generated from a cut portion of the electrode sheet.

Referring to (c) of FIG. 1, when the upper cutter moves upwards after cutting the electrode sheet, the foreign matter may be separated from the cut portion of the electrode sheet.

Korean Registered Patent Publication Number 1893706 discloses a separator cutting apparatus for secondary batteries configured to cut a raw material for separators, the separator cutting apparatus including a cutting unit configured to cut the raw material for separators along a predetermined cutting line, wherein the cutting unit includes a cutter member having a first cutter end and a second cutter end, and a cleaner member configured to remove contaminants generated when the raw material for separators is cut. However, the construction of a separated foreign matter removal unit provided at an electrode cutting apparatus including an upper cutter and a lower cutter is not disclosed.

Korean Registered Patent Publication Number 1475703 discloses an electrode production system including upper and lower mold fixing plates and a dust collection nozzle configured to suction foreign matter, wherein the upper and lower mold fixing plates are moved through a crank shaft. However, the construction of a separated foreign matter removal unit including an electrode sheet gripper and a blow unit provided at an electrode cutting apparatus including an upper cutter and a lower cutter is not disclosed.

Therefore, there is a need to develop an electrode cutting apparatus including a separated foreign matter removal unit configured to easily remove foreign matter generated from an electrode sheet cut through upward and downward reciprocation of an upper cutter and a lower cutter through blowing and suction and to be repeatedly operated and stopped in a state of being interlocked with upward and downward reciprocation of the cutters in order to effectively remove the separated foreign matter.

DISCLOSURE

Technical Problem

The present invention has been made in view of the above problems, and it is an object of the present invention to provide an electrode cutting apparatus including a separated foreign matter removal unit capable of immediately removing separated foreign matter generated at the time of electrode cutting through a blow unit and a suction unit configured to be repeatedly operated and stopped according to an electrode cutting operation in order to remove separated foreign matter generated when the electrode cutting apparatus, which includes an upper cutter, performs electrode cutting.

Technical Solution

In order to accomplish the above object, an electrode cutting apparatus according to the present invention includes an upper unit (100) including an upper cutter (110) disposed above an electrode sheet; a lower unit (200) including a lower cutter (210) disposed under the electrode sheet; a gripper (400) configured to face an electrode sheet supplied between the upper cutter, which is configured to perform upward and downward reciprocation, and the lower cutter, which is stationary, in parallel therewith, the gripper being configured to fix the electrode sheet; an upper gripper (410); and a blow unit (500) located at the upper gripper (410), the blow unit being configured to remove foreign matter generated when the supplied electrode sheet is cut.

The electrode cutting apparatus may further include a lower gripper (420) and a suction unit located at the lower unit and the lower gripper (420).

The electrode cutting apparatus may further include a suction blow valve unit (700) formed at one side of the upper unit, the suction blow valve unit being configured such that an air pressure valve (not shown) connected via a blow fitting portion (510) of the blow unit and a valve blow fitting portion (710) is opened only when the upper cutter is moved downwards.

The blow unit may be provided with an injection nozzle (520), and the injection nozzle may be located so as to face the portion at which the upper cutter and the lower cutter cross in the state in which the electrode sheet is interposed therebetween.

The injection nozzle may have a downward angle of greater than 0 degrees to less than 90 degrees based on a horizontal plane.

The suction unit may have a section that is gradually narrowed from the upper part to the lower part thereof, the width of an upper suction portion (610) that faces the lower cutter may be formed so as to correspond to the width of the lower cutter, and the width of the upper suction portion may be gradually narrowed from the surface thereof corresponding to the lower cutter.

The surface of the upper suction portion that faces the lower cutter may be provided with a plurality of suction holes (620).

The suction unit may be provided in a side surface thereof adjacent to the upper suction portion with a plurality of vacuum prevention holes (630).

A suction fitting portion (640) of the suction unit and a valve suction fitting portion (720) of the suction blow valve unit may be operated through upward and downward movement of the suction blow valve (730) simultaneously with cross between the upper cutter and the lower cutter or a predetermined time after cross between the upper cutter and the lower cutter.

The blow unit may be provided at one side thereof with an injection adjustment portion (530) configured to adjust the injection flow rate and/or the number of injections of the injection nozzle.

Advantageous Effects

As is apparent from the above description, an electrode cutting apparatus including a separated foreign matter removal unit according to the present invention is configured such that the separated foreign matter removal unit is operated and stopped in a state of being interlocked with upward and downward reciprocation of an upper cutter and a lower cutter, whereby it is possible to continuously remove separated foreign matter.

In addition, the separated foreign matter removal unit is further assembled to a main body of the electrode cutting apparatus, whereby it is possible to accurately and easily remove separated foreign matter without being affected by adjustment of clearance and parallelism between the upper cutter and the lower cutter.

In addition, the separated foreign matter removal unit is mounted to the main body so as to be interlocked with operation of the upper cutter and the lower cutter, whereby it is possible to manage electrodes cut so as to have consistent quality.

In addition, it is possible to effectively remove foreign matter having an electrode mixture layer separated from the cut surface of an electrode cut using the electrode cutting apparatus including the separated foreign matter removal unit according to the present invention, whereby it is possible to reduce an electrode defect rate and to increase electrode production speed.

DESCRIPTION OF DRAWINGS

FIG. 1 is a conceptual view showing that separated foreign matter is generated at a conventional electrode cutting apparatus.

FIG. 2 is a perspective view of an electrode cutting apparatus including a separated foreign matter removal unit according to an embodiment of the present invention.

FIG. 3 is a front view and a perspective view of a suction blow valve unit according to an embodiment of the present invention.

FIG. 4 is a perspective view of a blow unit according to an embodiment of the present invention.

FIG. 5 is a perspective view of a suction unit according to an embodiment of the present invention.

FIG. 6 is a detailed perspective view of the electrode cutting apparatus to which the blow unit and the suction unit according to the embodiments of the present invention are applied.

FIG. 7 is a photograph showing the capture of foreign matter generated when the separated foreign matter removal unit according to the embodiment of the present invention is operated and stopped.

FIG. 8 is a table showing a comparison in particle size distribution of foreign matter generated when the separated foreign matter removal unit according to the embodiment of the present invention is operated and stopped.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 2 is a perspective view of an electrode cutting apparatus including a separated foreign matter removal unit according to an embodiment of the present invention.

The electrode cutting apparatus may include an upper unit 100 including an upper cutter 110 disposed above an electrode sheet; a lower unit 200 including a lower cutter 210 disposed under the electrode sheet; a guide portion 300 configured to guide upward and downward movement of the upper unit; a gripper 400 configured to face the electrode sheet, which is supplied between the upper cutter (which performs upward and downward reciprocation) and the lower cutter (which is stationary) in parallel therewith, the gripper being configured to fix the electrode sheet; an upper gripper 410; and a blow unit 500 located at the upper gripper 410, the blow unit being configured to remove foreign matter generated when the electrode sheet is cut.

The upper unit may include an upper cutter configured to cut the electrode sheet, an upper holder to which the upper cutter is fixed, and an upper frame to which the upper holder is mounted.

The upper cutter may be configured to have a double-edged structure in which a central portion of the upper cutter is short, and opposite ends of the upper cutter are long. For example, the lower part of the upper cutter may have a curved arch shape when viewed in plan view or a bent polygonal structure when viewed in plan view.

The lower unit may include a lower cutter configured to cut the electrode sheet and a lower frame to which the lower cutter is fixed.

A moving unit 130 configured to transmit power to the upper unit may be further included.

The moving unit performs a function of transmitting power necessary for upward and downward movement of the upper frame and a function of preventing occurrence of tolerance in clearance between the upper cutter and the lower cutter.

Specifically, the electrode sheet is cut in the state in which the clearance between the upper cutter and the lower cutter is accurately adjusted. As the number of cuttings is increased, tolerance occurs in the adjusted clearance between the upper cutter and the lower cutter, and the tolerance may deviate from a permitted limit.

In the present invention, as described above, the moving unit is further disposed at a central portion of the upper frame in order to guarantee straightness in upward and downward movement of the upper cutter, whereby distortion of the upper cutter may be prevented, and therefore uniform force of cutting the electrode sheet may be maintained.

The gripper includes a pair of an upper gripper and a lower gripper disposed respectively at the upper surface and the lower surface of the electrode sheet.

The clearance between the upper gripper and the lower gripper may be reduced so as to grip the electrode sheet. Alternatively, the clearance between the upper gripper and the lower gripper may be adjusted in the state in which the upper gripper and the lower gripper are spaced apart from each other such that cutting and feeding of the electrode sheet are continuously performed.

In the electrode cutting apparatus according to the present invention, the electrode sheet may be disposed between the upper unit and the lower unit, and the upper cutter may be downwardly moved so as to be adjacent to the front surface of the lower cutter in order to cut the electrode sheet.

When the electrode sheet is fed by a feeding roller, a main body of the electrode cutting apparatus is synchronized with feeding speed of the electrode sheet and is moved in a feeding direction of the electrode sheet. When relative speed between the main body and the electrode sheet in the feeding direction becomes 0, the upper unit is moved upwards and downwards to cut the electrode sheet.

Subsequently, when the main body of the electrode cutting apparatus returns to a work start position, 1 cycle is completed, and the electrode sheet is cut while the cycle is repeated.

The upper unit 100 is disposed above an electrode sheet for cutting, the lower unit 200 is disposed under the electrode sheet for cutting, and the guide portion 300 performs a function of guiding upward and downward movement of the upper unit 100.

The upper unit 100 includes an upper cutter 110 configured to cut the electrode sheet, an upper holder 120 to which the upper cutter 110 is fixed, and an upper frame (not shown) to which the upper holder 120 is mounted.

The lower unit 200 includes a lower cutter 210 configured to cut the electrode sheet and a lower frame 220 to which the lower cutter 210 is fixed.

The electrode sheet is disposed between the upper unit 100 and the lower unit 200. The upper cutter 110 may be downwardly moved so as to be adjacent to the front surface of the lower cutter 210 in order to cut the electrode sheet.

When the upper cutter 110 is moved downwards, there may be formed no clearance between the lower cutter 210 and the upper cutter 110. Specifically, the clearance may be 0.

The electrode cutting apparatus may include a lower gripper 420, and a suction unit 600 located at the lower unit and the lower gripper 420.

FIG. 3 is a front view and a perspective view of a suction blow valve unit according to an embodiment of the present invention.

The suction blow valve unit may include a valve blow fitting portion 710 connected to the blow unit, and a valve suction fitting portion 720 connected to the suction unit.

The suction blow valve unit may include a suction blow valve 730 movable upwards and downwards, the suction blow valve being configured to serve as valves of (1) a suction fitting portion 640 of the suction unit and (2) the valve suction fitting portion 720 of the suction blow valve unit simultaneously, optionally with (e.g., at the time of) cross between the upper cutter and the lower cutter or a predetermined time after cross between the upper cutter and the lower cutter.

The rectangular suction blow valve may be coupled to a rectangular suction blow valve plate 740, and may serve as the valves of (1) the suction fitting portion 640 of the suction unit and (2) the valve suction fitting portion 720 of the suction blow valve unit while being moved upwards and downwards along a suction blow rail 750 formed on the suction blow valve plate.

That is, the suction blow valve itself may serve as a vacuum pressure valve between the suction fitting portion and the valve suction fitting portion.

In general, when the suction blow valve is moved upwards, the valve may be closed, and, when the suction blow valve is moved downwards, the valve may be opened. The upward and downward movement of the suction blow valve may be inversely configured as long as opening and closing of the valve are performed.

A suction blow valve unit 700 formed at one side of the upper unit may be included. The suction blow valve unit may be configured such that an air pressure valve (not shown) connected via a blow fitting portion 510 of the blow unit and the valve blow fitting portion 710 is opened only when the upper cutter is moved downwards.

A fluid, preferably air, necessary to blow foreign matter generated at the electrode cutting apparatus may be supplied from the suction blow valve unit.

Vacuum pressure necessary to remove separated foreign matter generated at the electrode cutting apparatus by suctioning may be supplied from the suction blow valve unit.

The suction blow valve unit is a switching structure configured to connect the blow unit and/or the suction unit for supply of main air pressure and removal of foreign matter in response to operation of the electrode cutting apparatus.

That is, the suction blow valve unit controls air and vacuum pressure necessary for the blow unit and/or the suction unit in a state of being interlocked with upward and downward reciprocation of the upper cutter formed at the upper unit.

FIG. 4 is a perspective view of a blow unit according to an embodiment of the present invention.

The blow unit may be provided with an injection nozzle 520, and the injection nozzle may be located so as to face the portion at which the upper cutter and the lower cutter cross in the state in which the electrode sheet is interposed therebetween.

Preferably, the blow unit is formed at each of opposite ends of the upper surface of the upper gripper so as to correspond to the upper cutter.

The injection nozzle may have a downward angle $\alpha$ of greater than 0 degrees to less than 90 degrees based on a horizontal plane. The downward angle of the injection nozzle is preferably 10 degrees to 60 degrees, more preferably 20 degrees to 45 degrees. The downward angle of the injection nozzle may be 30 degrees. If the downward angle of the injection nozzle deviates from the above range, foreign matter may not be smoothly separated.

FIG. 5 is a perspective view of a suction unit according to an embodiment of the present invention.

The suction unit may have a section that is gradually narrowed from the upper part to the lower part thereof, and the width of an upper suction portion 610 that faces the lower cutter may be formed so as to correspond to the width of the lower cutter. The upper suction portion may have a shape in which the width of the upper suction portion is gradually narrowed from the surface thereof corresponding to the lower cutter.

Preferably, the shape is an inverted equilateral triangle (∇).

FIG. 6 is a detailed perspective view of the electrode cutting apparatus to which the blow unit and the suction unit according to the embodiments of the present invention are applied.

The surface of the upper suction portion that faces the lower cutter may be provided with a plurality of suction holes 620. Foreign matter separated by the blow unit may be introduced into the suction holes, whereby the foreign matter may be removed.

Example 1

Experiments were performed using an electrode cutting apparatus including a separated foreign matter removal unit according to an embodiment of the present invention.

Foreign matter generated while a supplied electrode sheet was cut 10,000 times using the electrode cutting apparatus including the separated foreign matter removal unit was captured and analyzed. As a comparative example, foreign matter generated while the electrode sheet was cut 10,000 times in the state in which the separated foreign matter removal unit was not operated was captured and analyzed.

Foreign matter generated at the time of cutting was captured under the electrode cutting apparatus for comparison in amount of the foreign matter.

FIG. 7 is a photograph showing capture of foreign matter generated when the separated foreign matter removal unit according to the embodiment of the present invention is operated and stopped.

It can be seen from FIG. 7 that the capture amounts of separated foreign matter were different from each other, as can be seen from photographs, and that the amount of foreign matter captured when the separated foreign matter removal unit was operated was reduced by about 50% or more.

FIG. 8 is a table showing a comparison in particle size distribution of foreign matter generated when the separated foreign matter removal unit according to the embodiment of the present invention is operated and stopped.

As the result of analysis, the largest size of foreign matter captured when the separated foreign matter removal unit of the electrode cutting apparatus was operated was 714 μm, and the largest size of metallic foreign matter was 297 μm.

As the result of analysis, the largest size of foreign matter captured when the separated foreign matter removal unit of the electrode cutting apparatus was not operated was 861 μm, and the largest size of metallic foreign matter was 634 μm.

Those skilled in the art to which the present invention pertains will appreciate that various applications and modifications are possible within the category of the present invention based on the above description.

DESCRIPTION OF REFERENCE NUMERALS

1: Electrode sheet
100: Upper unit
110: Upper cutter
120: Upper holder
200: Lower unit
210: Lower cutter
220: Lower frame
300: Guide portion
400: Gripper
410: Upper gripper
420: Lower gripper
500: Blow unit
510: Blow fitting portion
520: Injection nozzle
530: Injection adjustment portion
600: Suction unit
610: Upper suction portion
620: Suction hole
630: Vacuum prevention hole
640: Suction fitting portion
700: Suction blow valve unit
710: Valve blow fitting portion
720: Valve suction fitting portion
730: Suction blow valve
740: Suction blow valve plate
750: Suction blow valve rail

The invention claimed is:

1. An electrode cutting apparatus comprising:

a first unit comprising a first cutter disposed on a first side of an electrode sheet;

a second unit comprising a second cutter disposed on a second side of the electrode sheet;

a gripper configured to face the electrode sheet supplied between the first cutter, which is configured to reciprocate, and the second cutter, which is configured to remain stationary, the second cutter extending parallel with the first cutter, and the gripper being configured to fix the electrode sheet;

a first gripper included on the gripper;

a blow unit located at the first gripper, the blow unit configured to remove foreign matter generated when the electrode sheet is cut; and a suction blow valve unit configured such that a suction blow valve is opened when the first cutter is moved downwards, wherein the suction blow valve unit is configured to supply a fluid to remove the foreign matter, and wherein the suction blow valve is configured for movement along a suction blow rail and such movement is configured to open and close the suction blow valve.

2. The electrode cutting apparatus according to claim 1, further comprising a second gripper; and a suction unit located at the second unit and the second gripper.

3. The electrode cutting apparatus according to claim 2, wherein the suction blow valve unit is configured to connect the blow unit and the suction unit for supply of main air pressure and removal of the foreign matter.

4. The electrode cutting apparatus according to claim 2, wherein the suction unit has a section that is gradually narrowed from a first part to a second part thereof, a width of a first suction portion that faces the second cutter is formed so as to correspond to a width of the second cutter, and the width of the first suction portion is gradually narrowed from a surface thereof corresponding to the second cutter.

5. The electrode cutting apparatus according to claim 4, wherein a surface of the first suction portion that faces the second cutter defines a plurality of suction holes.

6. The electrode cutting apparatus according to claim 4, wherein the suction unit is provided in a side surface thereof adjacent to the first suction portion with a plurality of vacuum prevention holes.

7. The electrode cutting apparatus according to claim 1, wherein the suction blow valve unit is formed at one side of the first unit, and the suction blow valve unit is configured such that the suction blow valve is connected via a blow fitting portion of the blow unit and a valve blow fitting portion is in an open state only when the first cutter is in a downward position.

8. The electrode cutting apparatus according to claim 7, wherein a suction fitting portion of the suction unit and a valve suction fitting portion of the suction blow valve unit are operated through movement in opposing directions of the suction blow valve simultaneously with a cross between the first cutter and the second cutter or a predetermined time after the cross between the first cutter and the second cutter.

9. The electrode cutting apparatus according to claim 7, wherein the blow unit is provided with an injection nozzle, and wherein the injection nozzle is located so as to face a portion at which the first cutter and the second cutter cross in a state in which the electrode sheet is interposed between the first cutter and the second cutter.

10. The electrode cutting apparatus according to claim 9, wherein the injection nozzle has a downward angle of greater than about 0 degrees to less than about 90 degrees relative to a horizontal plane.

11. The electrode cutting apparatus according to claim 9, wherein the blow unit is provided at one side thereof with an injection adjustment portion configured to adjust an injection flow rate and/or a number of injections of the injection nozzle.

12. The electrode cutting apparatus according to claim 1, wherein the suction blow valve is coupled to a suction blow valve plate and configured to move upwards and downwards along the suction blow rail which is formed on the suction blow valve plate.

13. The electrode cutting apparatus according to claim 1, wherein the suction blow valve unit is interlocked with upward and downward reciprocation of the first cutter.

* * * * *